United States Patent Office 3,414,586
Patented Dec. 3, 1968

3,414,586
ACETOAMIDO DERIVATIVES
Susumu Umemoto, Sakai-shi, and Toyoyuki Shimizu, Nishinomiya-shi, Japan, assignors to Dainippon Pharmaceutical Co., Ltd., Osaka, Japan, a corporation of Japan
No Drawing. Filed Sept. 28, 1964, Ser. No. 399,861
Claims priority, application Japan, Oct. 1, 1963, 38/53,074
2 Claims. (Cl. 260—328)

ABSTRACT OF THE DISCLOSURE

This application relates to certain novel acetoamide derivatives having tranquillizing activity.

---

This invention relates to novel acetoamide derivatives and process for preparing thereof. More particularly, the invention relates to the compounds having tranquillizing activity, which can be represented by the formula

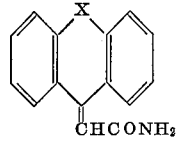

wherein X is a member selected from the group consisting of direct bond, oxygen and sulfur.

The new compounds of this invention are 9-fluorenylideneacetoamide, 9-xanthenylideneacetoamide and 9-thioxanthenylideneacetoamide.

The compounds of this invention have been proved to have a potent oral tranquillizing activity from the results obtained in animal experiments. Features of the pharmacological activity were strong tranquillizing and taming effects without any manifestation of neutrotoxicity such as ataxia or relaxation. The compounds have no lethal toxicity in mice and rats at oral dose of 3000 mg./kg.

The compounds of the Formula I can be prepared by hydrolyzing a compound of the formula

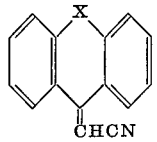

wherein X has the same meaning as before.

As hydrolyzing agent, acid or alkali such as hydrochloric acid, sulfuric acid, sodium hydroxide, and potassium hydroxide may be used. The condition which we prefer involves the use of alkali as the hydrolyzing agent. Water, methanol and ethanol may be employed as the reaction medium. The reaction time can by shortened by heating.

An alternate method for preparing the compounds of the Formula I comprises reacting a compound of the formula

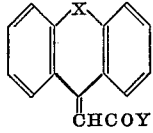

wherein X has the same meaning as before and Y is a radical for reaction with ammonia to form the acetoamide thereof, with ammonia.

The addition derivatives of acetic compounds encompassed by Formula III are acid halides such as chloride, bromide, acid anhydrides and esters such as methyl ester, ethyl ester. The compound of the Formula I can be prepared by blowing ammonia gas into a compound of Formula III in a solvent such as water, methanol, ethanol, or benzene or by adding a concentrated aqueous solution of ammonia to a compound of Formula III in water. When an ester is used as a starting material in this reaction, use of elevated temperatures serves to promote the reaction.

The following examples are given to illustrate the practice of this invention, but are not to be construed as limiting.

Example 1

19 g. of fluorenylideneacetonitrile and 19 g. of potassium hydroxide were dissolved in a mixture in 100 ml. of water and 100 ml. of ethanol, followed by refluxing for 4 hours. After distilling off ethanol, water is added to the residue. Crystals which separated out were filtered off and recrystallized from dioxane to give 9 g. of yellow needle crystalline 9-fluorenylideneacetoamide. M.P. 230–231° C.

Example 2

An excess of ammonia gas was blown into a solution of 24 g. of 9-fluorenylideneacetochloride in 20 ml. of dry benzene. After distilling off benzene, the residue was washed with diluted sodium carbonate and water, and recrystallized from ethanol to give 20.5 g. of yellow needle crystalline 9-fluorenylideneacetoamide. M.P. 230–231° C.

Example 3

35 g. of 9-xanthenylideneacetonitrile and 45 g. of sodium hydroxide were dissolved in a mixture of 100 ml. of water and 200 ml. of ethanol, followed by refluxing for 6 hours. After distilling off ethanol, the residue was washed with water, and dissolved in hot ethanol. 15 g. of 9-xanthenylideneacetonitrile which separated from the ethanol solution by cooling were removed. The mother solution of ethanol was concentrated and the residue was recrystallized from acetonitrile to give 10 g. of white needle crystalline 9-xanthenylideneacetoamide. M.P. 190–192° C.

Example 4

24 g. of thioxanthenylideneacetonitrile and 23 g. of sodium hydroxide were dissolved in a mixture of 50 ml. of water and 100 ml. of ethanol after which the same treatment as in Example 3 is given, followed by recrystallizing from ethyl acetate to give 12 g. of white needle crystalline 9-thioxanthenylideneacetoamide. M.P. 170–172° C.

What is claimed is:
1. 9-fluorenylideneacetoamide.
2. 9-thioxathenylideneacetoamide.

References Cited

Morrison et al., Organic, Chemistry (Allyn & Bacon, Boston, 1959) p. 481.
Fieser et al., Advanced Organic Chemistry (Reinhold, New York, 1961) p. 366.
Goldberg et al. J. of Chem. Soc., 1957, 4823–9.
Goldberg et al. J. of Chem. Soc. 1960, 453–5.
Morrison et al. Org. Chem. (Allyn & Bacon, Boston, 1959) p. 484.
Chemical Abstract, vol. 54, Formula Index, p. 365F (1960).

HENRY R. JILES, Primary Examiner.
C. M. SHURKO, Assistant Examiner.

UNITED STATES PATENT OFFICE
CERTIFICATE OF CORRECTION

Patent No. 3,414,586                            December 3, 1968

Susumu Umemoto et al.

It is certified that error appears in the above identified patent and that said Letters Patent are hereby corrected as shown below:

In the heading to the printed specification, line 9, "38/53,074" should read -- 53,074/63 --. Column 1, line 39, "neutrotoxicity" should read -- neurotoxicity --. Column 2, line 17, "mixture in" should read -- mixture of --.

Signed and sealed this 10th day of March 1970.

(SEAL)
Attest:

Edward M. Fletcher, Jr.                     WILLIAM E. SCHUYLER, JR.
Attesting Officer                               Commissioner of Patents